(12) United States Patent
Brennan et al.

(10) Patent No.: US 11,619,071 B2
(45) Date of Patent: Apr. 4, 2023

(54) EXIT DEVICE FOR HIGH WIND ENVIRONMENTS

(71) Applicant: Hanchett Entry Systems, Inc., Phoenix, AZ (US)

(72) Inventors: John Austin Brennan, Phoenix, AZ (US); Daniel Patrick Van Dusen, Mesa, AZ (US); Neil Brendan O'Leary, Tempe, AZ (US); Richard Samuel Kreidel, Polson, MT (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 552 days.

(21) Appl. No.: 16/710,861

(22) Filed: Dec. 11, 2019

(65) Prior Publication Data

US 2020/0181949 A1   Jun. 11, 2020

Related U.S. Application Data

(60) Provisional application No. 62/777,854, filed on Dec. 11, 2018.

(51) Int. Cl.
*E05B 65/10* (2006.01)
*E05C 3/16* (2006.01)

(52) U.S. Cl.
CPC .......... *E05B 65/1053* (2013.01); *E05C 3/162* (2013.01)

(58) Field of Classification Search
CPC .............................. E05B 65/1053; E05C 3/162
See application file for complete search history.

(56) References Cited

U.S. PATENT DOCUMENTS

| 2,261,652 | A | * | 11/1941 | La Mere | ................. | E05F 1/105 |
| | | | | | | 16/72 |
| 10,030,411 | B2 | * | 7/2018 | Coleman | ............ | E05B 17/0041 |
| 10,072,444 | B2 | * | 9/2018 | Lehner, Jr. | ............. | E05F 11/54 |
| 10,844,637 | B2 | | 11/2020 | Yalamati et al. | | |
| 2010/0026012 | A1 | * | 2/2010 | Lin | ..................... | E05B 65/1053 |
| | | | | | | 292/92 |
| 2010/0045053 | A1 | * | 2/2010 | Dye | .................... | E05B 65/1053 |
| | | | | | | 292/201 |
| 2012/0032455 | A1 | * | 2/2012 | Lin | ..................... | E05B 17/0041 |
| | | | | | | 292/92 |

(Continued)

FOREIGN PATENT DOCUMENTS

WO    2019032673    2/2019

*Primary Examiner* — Mark A Williams
(74) *Attorney, Agent, or Firm* — Woods Oviatt Gilman LLP; Dennis B. Danella, Esq.

(57) ABSTRACT

A door latch system includes an exit device having a housing mounted to an unsecured side of a door. A latch assembly is mounted in the housing and includes a latch for releasably securing the door in a door frame. An actuating assembly includes a driving member. A push bar is configured to be received within the housing. Relative movement between the push bar and base plate so as to reduce the distance between the push bar and base plate moves the driving member and latch to release the door from the door frame. A dashpot is connected to the driving member and configured to allow movement of the driving member when the push bar is manually depressed but to resist movement of the driving member when a secure side of the door experiences a high velocity impact. A method of resisting unwanted unlatching of the latch is also disclosed.

9 Claims, 4 Drawing Sheets

(56) References Cited

U.S. PATENT DOCUMENTS

| | | | |
|---|---|---|---|
| 2015/0184426 A1* | 7/2015 | Arlinghaus | E05B 65/1053 |
| | | | 292/138 |
| 2018/0128015 A1* | 5/2018 | Shah | E05B 65/1053 |
| 2018/0148955 A1* | 5/2018 | Yalamati | E05B 17/0041 |
| 2019/0048618 A1* | 2/2019 | McKibben | E05B 65/1006 |
| 2019/0376331 A1 | 12/2019 | Mckibben et al. | |
| 2020/0011100 A1 | 1/2020 | Mani et al. | |
| 2021/0148141 A1 | 5/2021 | Yalamati et al. | |

* cited by examiner

EXIT DEVICE FOR HIGH WIND ENVIRONMENTS

RELATIONSHIP TO OTHER APPLICATIONS AND PATENTS

The present application claims the benefit of U.S. Provisional Patent Application No. 62/777,854, filed Dec. 11, 2018, which is hereby incorporated by reference in its entirety.

TECHNICAL FIELD

The present invention relates to a door latch system for latching a hinged door into a frame; and more particularly, to a door latch system for use with a push bar style exit device; and still more particularly to a door latch system for use with a push bar style exit device used with a door that may be subjected to high winds and flying debris, such as that experienced during a hurricane or tornado. The door latch system includes features to prevent unwanted actuation of the exit device when the door is struck by high velocity, wind-driven debris.

BACKGROUND OF THE INVENTION

Existing door latch systems, such as exit devices, incorporate a locking element, such as a latch, engageable with a mating strike. In unlocking, the latch of the exit device is required to rotate or retract out of the way of the mating strike to reach a state of being unlocked. The latch is typically mounted in a door and the strike in a door frame.

With reference to FIG. 1, an exit device 100 for an exterior door 102 may typically employ a push bar 104 to enable unlocking of the latch system 106 so as to enable door opening from the unsecured, interior side 108 of the door 102. Push bars allow users to open the door without necessarily requiring the use of their hands. Rather, the user's body can be used to push against the push bar until the latch is retracted from the strike.

Devices sold under UL specifications must meet an Emergency Operation Test standard whereby a horizontal force of 15 pounds or less applied to the push bar is required to enable operation of latch system 106. In order to return the push bar to its extended position after an opening force is applied to the push bar, manufacturers must provide for an internal biasing mechanism, such as a spring. Thus, the internal biasing mechanism must be carefully matched to the device so as to return the push bar to its extended position after force is removed from the push bar, yet still meet the UL specifications.

While exit devices designed to meet the UL specifications may adequately secure the door in a closed position during typical conditions, it has been found that these exit devices may fail when the door is subjected to sudden, high velocity impacts, such as when secure side 110 of door 102 is struck by windborne debris during a hurricane or tornado. Debris, such as tree limbs, construction materials, etc., may become airborne in high wind conditions. Hurricanes having wind speeds over 140 miles per hour (mph) and tornados with wind speeds exceeding 250 mph may create flying projectiles having velocities in excess of 100 mph that can strike surfaces (such as doors) with extremely high instantaneous impact energies.

To prevent breaches in building materials such as doors and door latches, numerous agencies have developed building code standards. One such agency is ASTM International (West Conshohocken, Pa., 19428) which has published standards designated E1886 and related E1996. These standards create test methods to simulate and rate performance when a secured door is impacted by projectiles and wind-borne debris during a natural disaster.

When a secured door having a push bar latching mechanism is impacted in accordance with the ASTM test, the dynamics of a high energy impact may cause the body or base plate of the push bar latching mechanism to instantaneously and momentarily move closer to the push bar itself. This relative movement between the base plate and push bar, if great enough, may cause the push bar to release the latch and therefore allow the door to swing free from its secured position. Thus, while the door material itself may pass the test, the latching mechanism of doors equipped with push bar exit devices may be breached under test conditions.

Thus, what is needed in the art is a door latch system and exit device which can withstand projectile impacts without unwanted actuation of the exit device. It is a principal object of the present invention to address this, as well as other, needs.

SUMMARY OF THE INVENTION

Briefly described, a door latch system includes a latch housing mounted to an unsecured side of a door. A latch assembly is mounted in the housing and includes a latch movable between a latched position and an unlatched position for releasably securing the door in a door frame. An actuating assembly includes a driving member movable between a driving member latched position and a driving member unlatched position. The actuating assembly also includes at least one actuating member acting upon the driving member. The actuating member may include, for example, first and second legs pivotally coupled to one another. The first leg is connected to a base plate of the latch housing and the second leg is slidably coupled to the driving member. A push bar is configured to be received within the housing at a movable distance from the base plate. Movement of the push bar relative to the base plate so as to reduce the distance between the push bar and base plate causes the driving member to translate in a direction perpendicular to the movement between the push bar and base plate thereby moving the latch toward its unlatched position. A dashpot is mounted to the latch housing and may be operatively connected to the driving member. The dashpot is configured to allow relatively free movement of the driving member when the distance between the push bar and base plate is reduced under normal operating conditions, and to oppose instantaneous movement of the driving member when a secure side of the door experiences a high velocity impact to reduce the distance between the push bar and base plate. Thus, the latch may remain latched when a high velocity impact against the door is sustained.

In accordance with an aspect of the present invention, the dashpot may be a pneumatic damper or a hydraulic damper.

The dashpot in accordance with the invention includes a dashpot body and a dashpot rod. The dashpot rod is positioned to react against movement of the actuating assembly such as the driving member and is configured to freely translate within the dashpot body when the push bar is manually depressed but to resist translation within the dashpot body when the secure side of the door experiences the instantaneous high velocity impact.

In accordance with a further aspect of the invention, a method of resisting unwanted unlatching of a latch of an exit device under high wind conditions is disclosed. The method includes the steps of:

a. determining the resistive force needed at the driving member to oppose unwanted movement of the push bar toward the housing when the door is struck on a secured side with a projectile at a high velocity simulating high wind conditions wherein the secured side is opposite said unsecured side of said door and wherein the unwanted movement of the push bar is a distance of movement sufficient to move the latch to the unlatched position;

b. selecting a dashpot configured so that, when positioned within the exit device so as to oppose a resulting movement of the driving member, the selected dashpot:
 i. resists the resulting movement with a first opposing force when the door is struck on said secured side with the projectile at a high velocity simulating high wind conditions; and
 ii. opposes movement of the driving member with a second opposing force when the push bar is operated under normal operating conditions, wherein the second opposing force is lesser than the first opposing force and the second opposing force is insufficient to prevent the latch from moving to the unlatched position; and c. positioning the dashpot within the exit device so as to oppose the resulting movement of said driving member.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
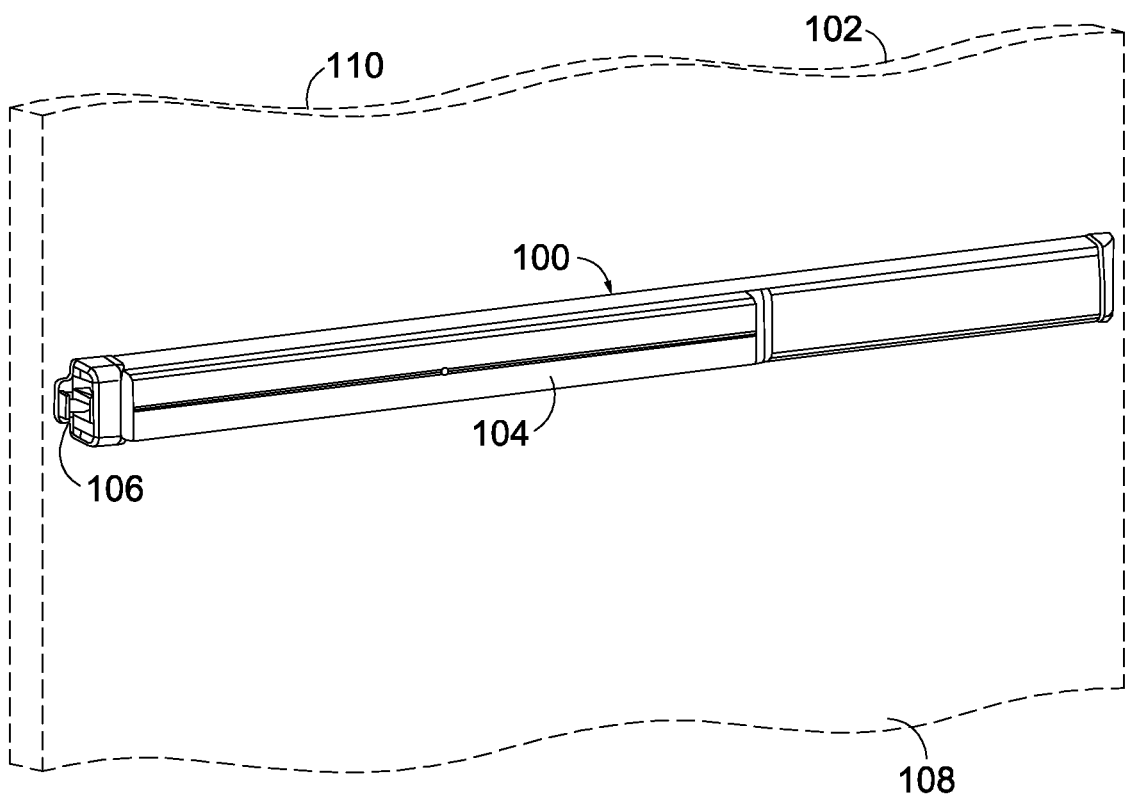
FIG. 1 is a perspective view of a prior art door latch system mounted onto a door.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Figure 2:
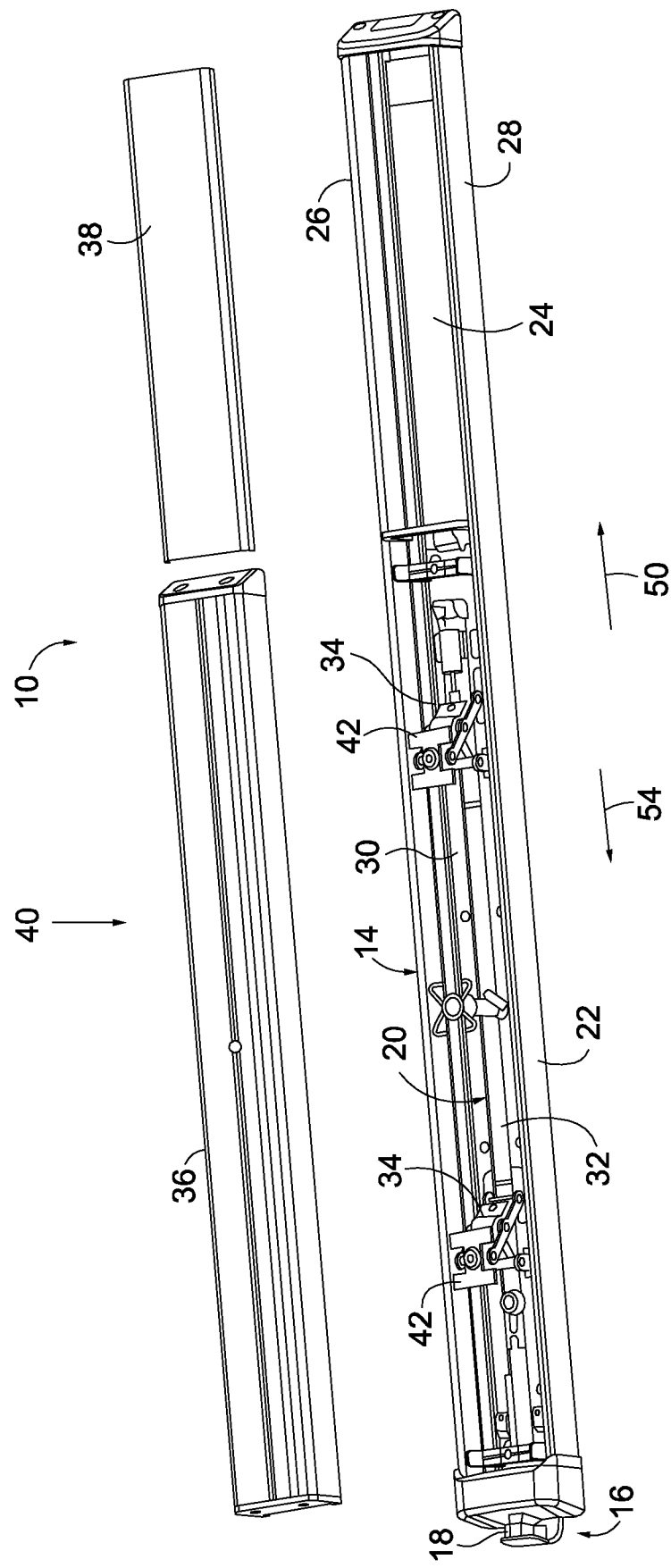
FIG. 2 is an exploded view of a door latch system in accordance with an aspect of the present invention.

Referring to FIG. 2, door latch mechanism 10 in accordance with the invention may be mounted onto a door (such as door 102, FIG. 1) and includes actuating assembly 14 and latch assembly 16 having a latch 18. A mating strike may be mounted on a door frame (not shown). Actuating assembly 14 includes actuating mechanism 20 which is mounted to housing 22. Housing 22 has a U-shaped cross section defined by a base plate 24 and opposing first and second sides 26, 28. Actuating mechanism 20 may include mounting bracket 30, a driving member 32, such as an actuating bar, movably connected to mounting bracket 30, at least one actuating member 34 and push bar 36. Actuating mechanism 20 may be actuable by push bar 36 secured within housing 22 which is mounted on the door (e.g., door 102). Cap 38 may be secured to housing 22 to cover any exposed internal components and present an aesthetically pleasing lock system (see also FIG. 1). Depression of push bar 36 into housing 22, such as in an actuating direction 40, causing distance A (FIG. 3) between the push bar 36 and base plate 24 to be reduced, moves driving member 32 to operate latch assembly 16 to disengage latch 18 from a corresponding strike which is secured in the door frame.

Figure 3:
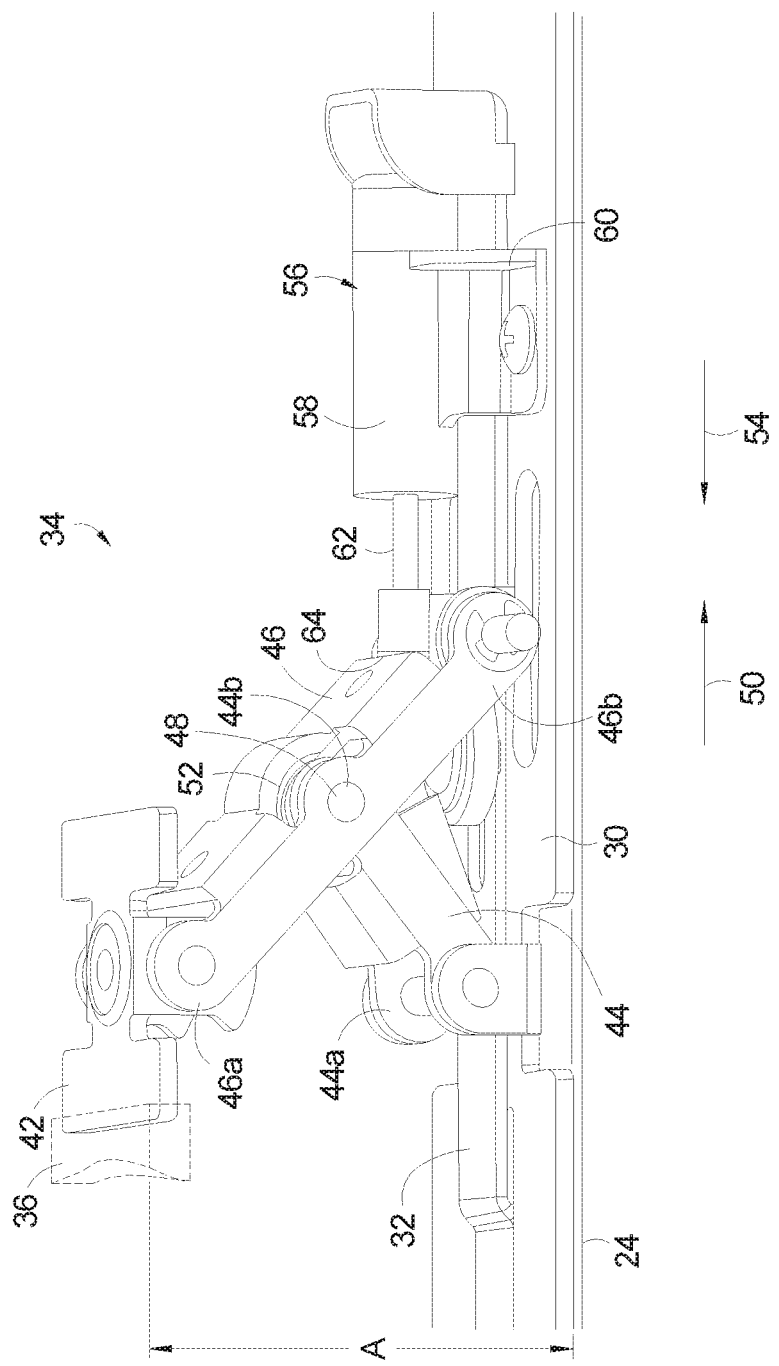
FIG. 3 is detailed view of a dashpot configured for use within the door latch system shown in FIG. 2.

With additional reference to FIG. 3, to facilitate depression of push bar 36 so as to direct latch 16 from the latched position to the unlatched position, push bar 36 may be coupled to at least one actuating member 34 by way of respective bar mounts 42 situated on each actuating member 34. In the example shown, each actuating member 34 may include a fixed leg 44 secured to mounting bracket 30 at a first end 44a and to a pivoting leg 46 at the opposing second end 44b via a pivot pin 48. Pivoting leg 46 may be pivotally coupled to bar mount 42 at a first end 46a and to driving member 32 at a second end 46b, wherein driving member 32 may be slidably coupled to mounting bracket 30 for linear movement. Mounting bracket 30 may be fixedly secured to the door (e.g., door 102) such that movement of push bar 36 in the actuating direction 40 through manual depression of push bar 36 causes driving member 32 to translate in the unlocking direction 50 and thereby causing latch 16 to withdraw from the strike. Each actuating member 34 may further include a biasing member 52 which may operate to urge driving member 32 in a restoring direction 54 to reverse direction of driving member 32 and return push bar 36 to the extended orientation whereby latch 16 is placed in the latched position so as to engage the strike and secure the door in the door frame.

With continued reference to FIG. 3, door latch mechanism 10 may further include a dashpot 56 to oppose movement of the push bar in actuating direction 40. As used herein, a dashpot is a viscous damping device. In accordance with an aspect of the present invention, dashpot 56 may be a pneumatic or hydraulic dashpot, although it should be understood by those skilled in the art that other suitable dashpots may be used.

Dashpot 56 resists motion via viscous friction. Inherent to its design, the resulting resistive force imposed by the dashpot through dashpot rod 62 is proportional to the velocity of the impacting force imposed on the dashpot through dashpot rod 62. The initial resistive or damping force of the dashpot may be varied, by design, by changing the viscosity of the dashpot's viscous material.

Figure 4:
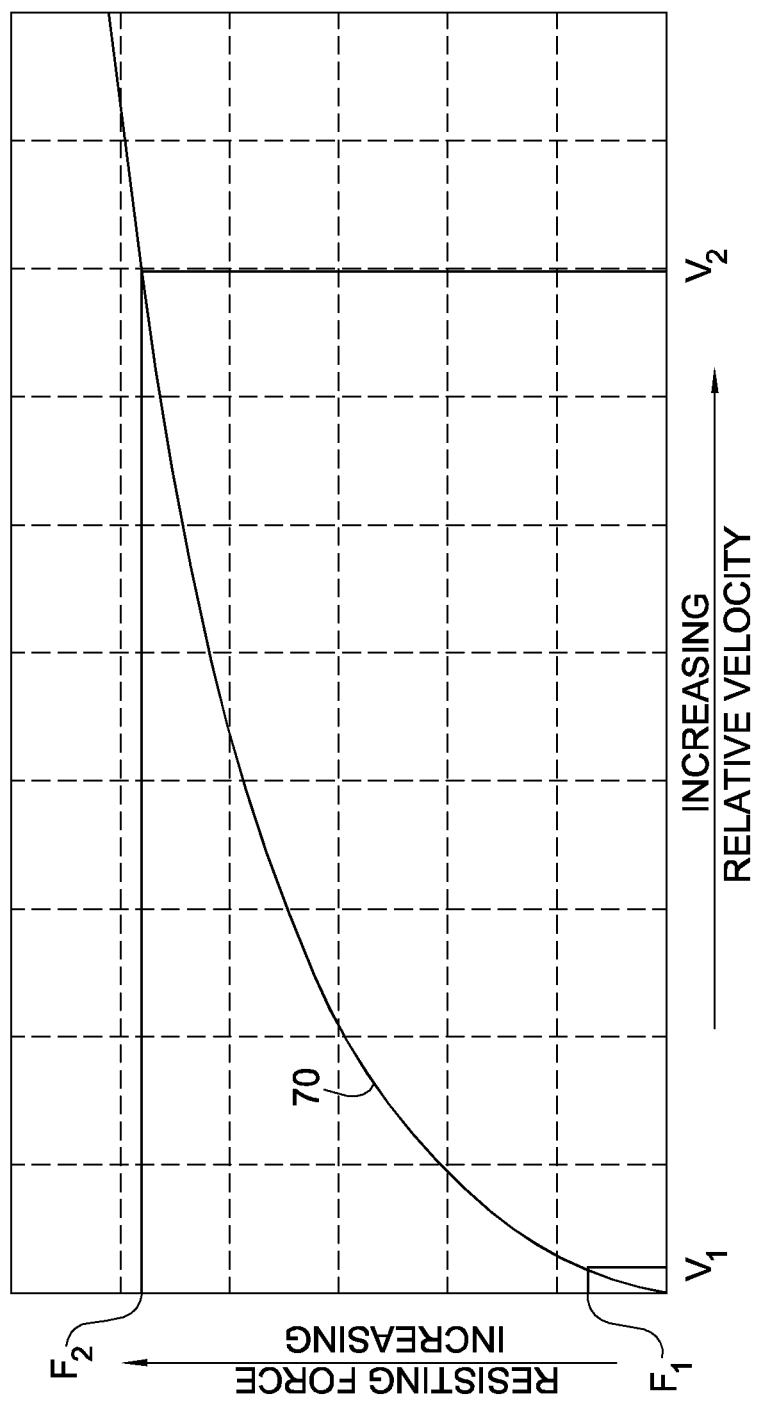
FIG. 4 depicts the relationship of the velocity of an impacting force applied to a dashpot to the resisting force imposed by the dashpot, in accordance with the invention.

Referring to FIG. 4, the inherent characteristic of a typical dashpot in accordance with the invention is shown (curve 70). When an impacting force at a relatively low velocity $V_1$ is applied to the dashpot, an almost negligible resistive force $F_1$ is imposed by the dashpot. However, when an impacting force at a relatively high velocity $V_2$ is applied to the same dashpot, a high resistive force $F_2$ is imposed by the dashpot.

Referring again to FIG. 3, dashpot 56 is configured to react to the force applied to it when the push bar is moved relative to mounting bracket 30. In the example shown, dashpot 56 includes a dashpot body 58 secured to the latch housing, such as via a mounting member 60. Dashpot rod 62, moves inward toward dashpot body 58 when a force is applied to it through actuating member 34, such as for example by driving member 32, when push bar 36 is moved toward base plate 24 in direction 40, so as to reduce distance A between push bar 36 and base plate 24.

In the example shown, terminal end 64 of rod 62 is positioned adjacent to pivoting leg 46 of actuating member 34 so as to oppose movement of driving member 32 when distance A is reduced. Terminal end 64 may abut directly against pivoting leg 46 or may be placed a slight distance (less than about ⅛ inch) away from pivoting leg 46. For those latch systems which include more than one actuating member 34 (such as door latch mechanism 10 shown in FIG. 2), dashpot 56 may be located adjacent any actuating member 34, but in accordance with one aspect of the present invention, is located adjacent the actuating member furthest from latch assembly 16.

It should be noted that terminal end 64 of rod 62 may be situated to contact driving member 32 to oppose movement between push bar 36 and base plate 24, or any other component of door latch system 10 that moves when distance A is reduced.

Under normal operating conditions, rod 62 may reciprocally travel within dashpot body 58 upon manual depression and release of push bar 36 (e.g., application of 15 pounds or less of actuation force on the push bar). Under these normal operating conditions, the velocity of the impacting force applied to rod 62 is relatively low and the resisting force imposed by the dashpot against movement of the push bar is negligible (see FIG. 4, $F_1$). As a result, dashpot 56 adds a minimal force, if any, to the force imposed on the push bar by biasing member 52 under normal operating conditions, thereby allowing door latch system 10 to meet the UL specification of 15 pounds of actuating force to retract latch 18. However, when the door experiences a high velocity impact, such as when struck by a projectile during a hurricane or tornado, dashpot 56 resists the momentary displacement of the door and base plate 24 toward the resting push bar 36 and a subsequent unwanted actuation of latch mechanism 16. Latch 18 may then remain securely seated within its mating strike with the door in its latch condition.

It is understood that the design features contributing to the damping characteristics of dashpot 56, including the viscosity of the viscous material, may be readily selected to match the operating characteristics of an associated exit device (e.g., the mass of the moving components; the coefficient of friction between moving surfaces) so as to provide the resisting force necessary to oppose movement of the push bar toward the door under hurricane conditions yet allow movement of the push bar under normal operating conditions to meet UL Specifications.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A door latch system comprising:
   a) a latch housing mounted to a door, wherein said latch housing includes a base plate;
   b) a latch assembly mounted in said latch housing and including a latch movable between a latched position and an unlatched position for releasably securing said door in a door frame;
   c) an actuating assembly fixedly secured to said latch housing including a driving member movable between a driving member latched position and a driving member unlatched position, wherein said actuating assembly includes at least one actuating member having a first leg and a second leg pivotally coupled to one another, wherein said first leg is connected to said base plate, and wherein said second leg is coupled to said driving member and movable relative to said base plate;
   d) a push bar operatively connected to said second leg at a movable distance from said base plate, wherein movement of said push bar by an external force to reduce said distance from said base plate causes said actuating assembly to translate said driving member in a direction perpendicular to said movement of said push bar thereby moving said latch toward said unlatched position; and
   e) a dashpot mounted to said latch housing and disposed in a position to contact said second leg of said actuating member and said driving member of said actuating assembly, wherein said dashpot includes a body and a dashpot rod, wherein said dashpot rod is movable from an extended position to a compressed position by said actuating assembly upon movement of said push bar toward said base plate by said external force,
   wherein said movement of said push bar toward said base plate by said external force causes said dashpot rod to oppose said push bar movement with a resistive force, wherein said resistive force is at a first magnitude when a driving force is applied to said dashpot rod at a first velocity by said external force acting on said push bar through said actuating assembly, wherein said resistive force is at a second magnitude when said driving force is applied to said dashpot rod at a second velocity by said external force acting on said push bar through said actuating assembly, and wherein said second velocity is greater than said first velocity.

2. The door latch system in accordance with claim 1 wherein said dashpot is a pneumatic dashpot.

3. A door latch system comprising:
   a) a latch housing mounted to an unsecured side of a door, wherein said latch housing includes a base plate, and wherein said door includes a secure side opposite said unsecured side;
   b) a latch movable between a latched position and an unlatched position for releasably securing said door in a door frame;
   c) a driving member movable between a driving member latched position and a driving member unlatched position;
   d) a push bar attached to said latch housing at a movable distance from said base plate, wherein relative movement between said push bar and said base plate by a first force to reduce said distance of said push bar from said base plate moves the driving member to the driving member unlatched position to thereby move said latch to the unlatched position to allow the door to be released from the door frame; and
   e) a dashpot mounted to said latch housing and operatively coupled to said push bar so that said dash pot opposes movement of said push bar toward said base plate, wherein said dashpot is configured to allow movement of said push bar toward said base plate when said push bar is manually depressed by said first force to move said latch to the unlatched position, and wherein said dashpot is configured to resist movement of said push bar when a second force impacts said secure side of the door so that said latch remains in the latched position, wherein said second force is greater than said first force.

4. A door latch system comprising:
a) a latch housing mounted to a first side of a door, wherein said latch housing includes a base plate;
b) a latch movable between a latched position and an unlatched position for releasably securing said door in a door frame;
c) a driving member movably attached to said base plate, wherein said driving member is movable between a driving member latched position and a driving member unlatched position;
d) a push bar attached to said latch housing at a movable distance from said base plate, wherein relative movement between said push bar and said base plate by a first input force to reduce said distance of said push bar from said base plate moves said driving member to said driving member unlatched position to thereby move said latch to said unlatched position to allow said door to be released from said door frame; and
e) a dashpot mounted to said latch housing, wherein said dashpot is configured for generating a first resistive force and a second resistive force to operatively oppose movement of said push bar, wherein said dashpot is configured to provide said first resistive force when said push bar is manually depressed at said first input force to allow movement of said push bar toward said base plate and said latch to said unlatched position, and wherein said dashpot is configured to provide said second resistive force when a second input force is imposed on said first side of the door so that said latch is kept in said latched position, wherein said second resistive force is greater than said first resistive force.

5. The door latch system in accordance with claim 4 wherein said first resistive force is 15 pounds or less.

6. The door latch system in accordance with claim 4 wherein said dashpot is a pneumatic or hydraulic dashpot.

7. The door latch system in accordance with claim 4 further comprising:
a fixed leg including a first end and a second end, wherein said first end of said fixed leg is pivotally coupled with said latch housing; and
a pivoting leg including a first end and a second end,
wherein said second end of said fixed leg is pivotally coupled with said pivoting leg between said first and second ends of said pivoting leg,
wherein said push bar is coupled with said first end of said pivoting leg,
wherein said second end of said pivoting leg is coupled with said driving member, and
wherein said dashpot is coupled with said second end of said pivoting leg.

8. The door latch system in accordance with claim 7 wherein said first resistive force is 15 pounds or less.

9. The door latch system in accordance with claim 7 wherein said dashpot is a pneumatic or hydraulic dashpot.

* * * * *